(12) United States Patent
Nguyen et al.

(10) Patent No.: US 11,303,963 B2
(45) Date of Patent: Apr. 12, 2022

(54) METHODS AND SYSTEMS FOR GENERATING A NOTIFICATION

(71) Applicant: Rovi Guides, Inc., San Jose, CA (US)

(72) Inventors: Calvin Nguyen, North Hills, CA (US); Donn Smith, New York, NY (US)

(73) Assignee: Rovi Guides, Inc., San Jose, CA (US)

( * ) Notice: Subject to any disclaimer, the term of this patent is extended or adjusted under 35 U.S.C. 154(b) by 94 days.

(21) Appl. No.: 16/510,765

(22) Filed: Jul. 12, 2019

(65) Prior Publication Data
US 2019/0342617 A1    Nov. 7, 2019

Related U.S. Application Data

(63) Continuation of application No. 14/575,264, filed on Dec. 18, 2014, now abandoned.

(51) Int. Cl.
| | |
|---|---|
| H04N 21/466 | (2011.01) |
| H04N 21/4722 | (2011.01) |
| H04N 21/442 | (2011.01) |
| H04N 21/45 | (2011.01) |
| H04N 21/81 | (2011.01) |

(52) U.S. Cl.
CPC ... *H04N 21/4668* (2013.01); *H04N 21/44204* (2013.01); *H04N 21/44222* (2013.01); *H04N 21/4532* (2013.01); *H04N 21/4667* (2013.01); *H04N 21/4722* (2013.01); *H04N 21/8133* (2013.01)

(58) Field of Classification Search
CPC ............ H04N 21/44222; H04N 21/4722
See application file for complete search history.

(56) References Cited

U.S. PATENT DOCUMENTS

| | | | | |
|---|---|---|---|---|
| 9,173,001 | B1* | 10/2015 | Roberts | H04N 21/26208 |
| 2002/0194593 | A1* | 12/2002 | Tsuchida | H04N 21/44008 |
| | | | | 725/32 |
| 2003/0221198 | A1* | 11/2003 | Sloo | H04N 21/47 |
| | | | | 725/136 |
| 2005/0166228 | A1* | 7/2005 | Takatori | H04N 21/4821 |
| | | | | 725/39 |
| 2007/0186267 | A1* | 8/2007 | Ohde | H04N 21/44222 |
| | | | | 725/135 |
| 2010/0007797 | A1* | 1/2010 | Stojancic | G06F 16/7847 |
| | | | | 348/607 |
| 2013/0030875 | A1* | 1/2013 | Lee | G06Q 30/0267 |
| | | | | 705/7.38 |
| 2013/0174195 | A1* | 7/2013 | Witenstein-Weaver | |
| | | | | H04N 21/4722 |
| | | | | 725/32 |
| 2013/0339998 | A1* | 12/2013 | Arme | H04N 21/6543 |
| | | | | 725/32 |
| 2014/0068670 | A1* | 3/2014 | Timmermann | H04N 21/482 |
| | | | | 725/40 |

(Continued)

*Primary Examiner* — Brian T Pendleton
*Assistant Examiner* — Frank Johnson
(74) *Attorney, Agent, or Firm* — Haley Guiliano LLP

(57) ABSTRACT

Methods and systems are disclosed herein for a media guidance application that alerts a user to the appearance of objects in media content that may be of interest to the user. For example, as media content progresses, the media guidance application may determine objects that may interest a user. The media guidance application may record the number of determined objects and present the number to the user as well as supplemental content associated with each object.

16 Claims, 5 Drawing Sheets

(56) References Cited

U.S. PATENT DOCUMENTS

| | | | |
|---|---|---|---|
| 2015/0039646 A1* | 2/2015 | Sharifi | G06F 16/683 707/769 |
| 2015/0169705 A1* | 6/2015 | Korbecki | G06F 16/248 707/736 |
| 2015/0186368 A1* | 7/2015 | Zhang | H04N 21/4756 707/740 |
| 2015/0245103 A1* | 8/2015 | Conte | G06Q 30/0643 725/60 |

* cited by examiner

METHODS AND SYSTEMS FOR GENERATING A NOTIFICATION

CROSS-REFERENCE TO RELATED APPLICATION

This application is a continuation of U.S. patent application Ser. No. 14/575,264, filed Dec. 18, 2014. The disclosure of which is hereby incorporated by reference herein in its entirety.

BACKGROUND

In conventional systems, users have access to a plethora of media content. With so much content available, users often require assistance in selecting content, and content providers often require assistance in selecting what content to provide to users. To aid in selecting content, systems often collect data related to what content a user watches (or does not watch), what content a user likes (or dislikes), etc. and stores this information in a user profile.

SUMMARY

Accordingly, methods and systems are described herein for a media guidance application that recommends content to a user based on a user's interests. Specifically, the media guidance application alerts a user to the appearance of objects in media content that may interest the user. For example, a user may be interested in video games and baseball as indicated by the user's profile. Furthermore, while watching a movie a user may encounter a scene where two characters are playing a video game such as "Mortal Kombat." Because the user is interested in video games, as indicated in the user's profile, the media guidance application may search for content associated with the video game (e.g., a new expansion pack). As the movie continues, another scene in the movie may show a baseball game. Because the user is interested in baseball, the media guidance application may search for content associated with the baseball game (e.g., a baseball game scheduled to be played in the near future). The media guidance application may record the number of scenes for which associated content was found and may present an indication of that number at the end of the movie.

Furthermore, the media guidance application may provide access to the content, additional information about the content, etc., when the user selects the indication. For example, in response to a selection of the indication, the media guidance application may provide a link to the new expansion and/or additional information about the expansion pack. Likewise, in response to a selection of the indication, the media guidance application may provide the user with an option to schedule a recording of the baseball game in the near future.

In some aspects, the media guidance application may present a portion of a media asset to a user. For example, the media guidance application may present a media asset such as a movie, a show, or a news program to the user. The media guidance application may also detect a particular portion of the media asset (e.g., a scene, chapter, segment between two commercial breaks, a segment beginning after the introduction credits, or ending before the closing credits, etc.).

The media guidance application may determine whether or not an object in the media asset is of interest to the user. For example, the media guidance application may compare the user's interests as indicated in a user's profile to the object (or information about the object) in the media asset. For example, in response to determining that an object corresponds to a particular character in the media asset, the media guidance application may determine whether or not the user is interested in the character (or an actor portraying the character) by comparing the character to a user profile associated with the user. For example, the media guidance application may base a determination of whether or not the user is interested in the character on whether or not the object (or information about the object) matches the user's interests.

The media guidance application may then determine whether or not a supplemental asset that corresponds to the object is available. For example, in response to determining that an object corresponding to the actor matches the user's interests, the media guidance application may search a database of supplemental assets for a supplemental asset corresponding to the actor.

The media guidance application may then, in response to determining that the supplemental asset is available, increment a counter, wherein the counter corresponds to a total number of supplemental assets available for the portion of the media asset. For example, if the media guidance application determined that a supplemental asset is available for the actor, the media guidance application may increment a counter. For example, if the counter previously stood at "four" (corresponding to four previously appearing objects that had supplemental assets available), the media guidance application may increment the counter to read "five" (corresponding to the addition of the supplemental asset for the actor).

The media guidance application may then determine that the portion of the media asset is no longer being presented. For example, the media guidance application may detect a trigger in the media asset that indicates that the scene featuring the object has ended, a commercial break has begun, and/or program credits are being presented.

The media guidance application may then, in response to determining that the portion of the media asset is no longer being presented, indicate a total number of supplemental assets available for the portion of the media asset to the user. For example, the media guidance application may present a number (e.g., "23") on the screen corresponding to the twenty-three supplemental assets that are available to the user.

In some embodiments, the media guidance application may also, in response to determining that the portion of the media asset is no longer being presented, generate for display a user-selectable indication of the supplemental asset, wherein the user-selectable indication comprises information about the supplemental asset. For example, the media guidance application may generate for display a listing for the supplemental asset that includes a title of the supplemental asset. Additionally or alternatively, the media guidance application may generate for display a short description of the supplemental asset. For example, the description may indicate the object to which the supplemental asset is related and/or describe the contents of the supplemental asset.

In some embodiments, the media guidance application may also determine whether the user selected the user-selectable indication. For example, based on whether or not the user selected the user-selectable indication, the media guidance application may determine whether or not to present a second supplemental asset related to the supplemental asset, at a future time. For example, the media guidance application may determine that the user is interested in cooking and that a character in a movie being presented to the user is cooking a meal. Based on that, the media guidance application may present to the user an advertisement of a cooking class. The media guidance application may further detect that the user selected the advertisement and based on that determination may generate for display, at a future time, an advertisement for another cooking class. Conversely, if the user did not select the cooking class, the media guidance application may not present to the user an advertisement for another cooking class in the future.

In some embodiments, the user-selectable indication may include an indication of user's level of interest in the supplemental asset. The media guidance application may store the user's level of interest in the supplemental asset and in the future may determine whether to present to the user a second supplemental asset related to the supplemental asset based on the level of interest stored. For example, if the user is interested in a specific actor and that actor is performing in a movie that the user is watching, the media guidance application may present to the user, during a commercial break or during end-of-the-movie credits, an offer to purchase another movie featuring the actor. The media guidance application may present to the user an icon (e.g., green colored circle, an icon with "Yes" on it or an icon with a smiley face on it) selectable by the user that indicates that the user is interested in the offer to purchase the other movie featuring the actor. The media guidance application may also present to the user an icon (e.g., a red colored circle, an icon with "No" on it or an icon with a sad face on it) selectable by the user that indicates that the user is not interested in the offer to purchase the other movie featuring the actor. When the user selects the icon indicating that he is interested in the offer to purchase the other movie, the media guidance application may present future offers to the user to purchase movies. Conversely, if the user selects the icon indicating that the user is not interested in purchasing the other movie, the media guidance application may not present to the user future offers to purchase movies featuring the actor.

In some embodiments, the media guidance application may, in response to determining that a supplemental asset that corresponds to an object is available, notify the user during the presentation of the portion of the media asset that the supplemental asset is available. For example, if the user is interested in motorcycles and a character in a movie that the user is watching is riding a motorcycle, the media guidance application may present to the user, during a commercial break or end-of-the-movie credits, an offer to buy tickets to a motorcycle show. The media guidance application may also notify the user of the availability of the offer by having the device that the movie is being watched on alert the user (e.g., through a vibration, an audio tone, a visual cue, etc.).

In some embodiments, the media guidance application may increment the counter in response to determining that multiple supplemental assets are available for an object in a portion of the media asset. For example, if the media guidance application determines that an object corresponds to multiple interests of the user (e.g., baseball game and a favorite baseball player), the media guidance application may present multiple supplemental assets (e.g., one corresponding to baseball and one corresponding to the baseball player).

In some embodiments, the media guidance application may determine that an object in the media asset is of interest to the user by cross-referencing the object with a database listing objects that are of interest to the user. If the media guidance application finds at least one match, than the object from the media asset is of interest to the user. For example, if a character is fishing in the media asset, the media guidance application may access a database that includes the user's interests (e.g., user profile) to determine whether the user is interested in fishing. The user profile may be based on the user's interactions with the media guidance application or may be based on the user entering his or her interests into a media guidance database.

In some embodiments, the media guidance application may determine that a supplemental asset that corresponds to an object is available by cross-referencing the object with a database listing assets that correspond to the object and selecting the supplemental asset from the assets that correspond to the object. For example, if the user likes skiing and a character is skiing in the media asset, the media guidance application may access a database in order to cross-reference skiing with objects in the database. If the media guidance application determines that several objects correspond to skiing (e.g., an email about new skis available for sale, an advertisement for an opening of a new ski resort and a sale at a ski store), the media guidance application may select one or more of those objects to present to the user.

In some embodiments, the media guidance application may indicate the number of supplemental assets available to the user on one of a different device and a different screen. For example, if the media guidance application is presenting a movie to a user via a smart TV or a set-top box, the media guidance application may present a counter of available supplemental assets on an electronic tablet or a smart phone associated with the user. Additionally or alternatively, if the media guidance application detects that a user device on which the movie is being presented includes two displays and the movie is being presented on the first display, the media guidance application may present the counter on the second display.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
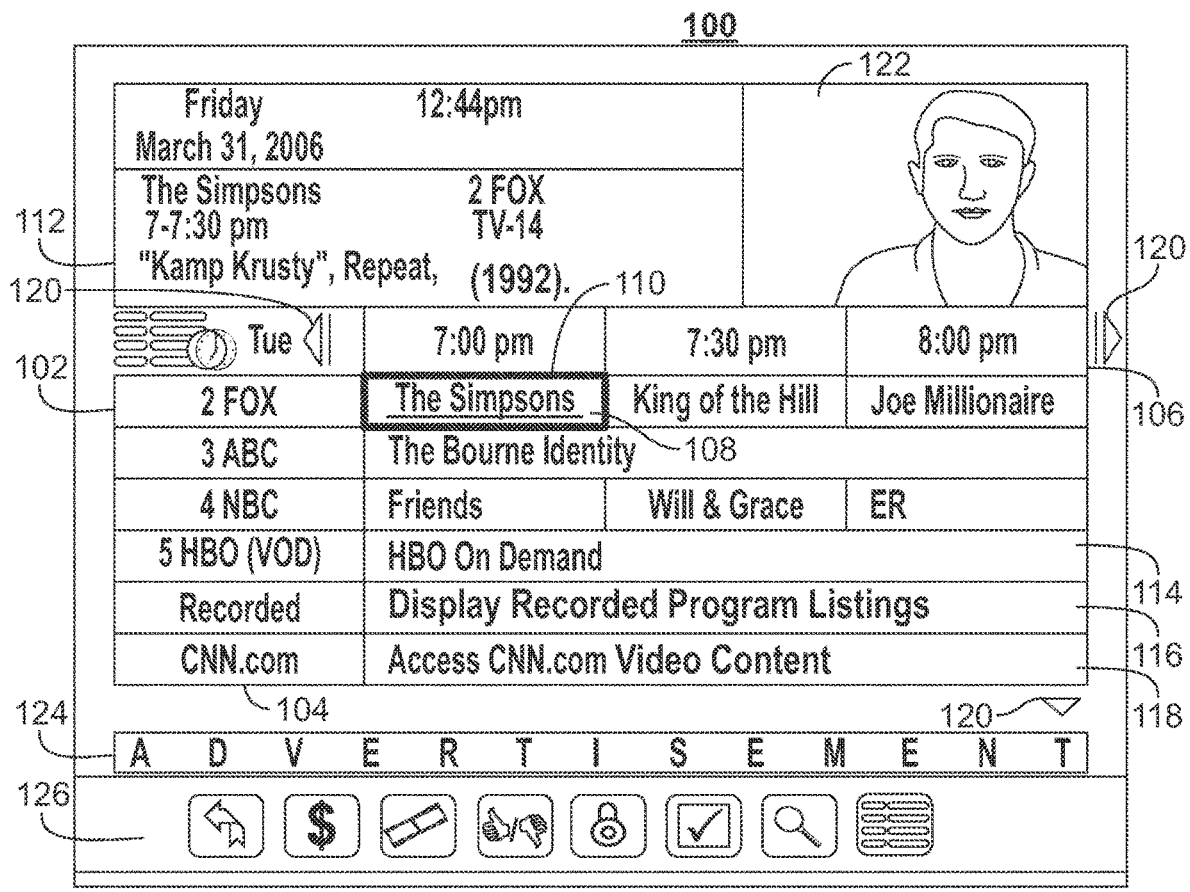
FIG. 1 shows an illustrative embodiment of a display screen that may be used to provide media guidance application listings and other media guidance information, in accordance with some embodiments of the disclosure.

Methods and systems are described herein for a media guidance application that alerts a user to the appearance of objects in media content that represent a user's interests. For example, the user may be interested in motorcycles and baseball. The media guidance application may store those interests in a user profile. While presenting a media asset (e.g., a movie, a news program, a show, etc.) to a user, the media guidance application may detect that a character in the media asset is riding a motorcycle. Based on the user being interested in motorcycles and the character riding a motorcycle in the media asset, the media guidance application may search for a supplemental asset to present to the user. As the media asset continues to be presented, the media guidance application may detect a scene from a baseball game. Based on the user being interested in baseball and the scene from the baseball game in the media asset, the media guidance application may search for another supplemental asset to present to the user. At an opportune time during the presentation of the media asset, the media guidance application may present to a user a counter that represents a number of supplemental assets available to the user.

As referred to herein, "a media guidance application," "interactive media guidance application," or "guidance application" is an application that allows a user to access available media content. The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and nonvolatile computer memory or storage devices such as a hard disk, floppy disk, USB drive, DVD, CD, media cards, register memory, processor caches, Random Access Memory ("RAM"), etc.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance. As referred to herein, the term "supplemental asset" should be understood to mean a media asset that is related to another media asset and/or an object in another media asset.

In some embodiments, a media guidance application may present (e.g., via control circuitry) a portion of a media asset to a user. For example, the media guidance application may be presenting a news program to a user. The news program may contain commercial breaks. A portion of the news program may include a segment or parts of the news program between commercial breaks. As referred to herein, a "portion" is a part of a media asset distinguishable from another part of the media asset or another media asset. A portion may be a scene, chapter, segment between two commercial breaks, a segment beginning after the introduction credits or a segment ending before the closing credits. In addition, a portion may be a news story or a news segment. For example, if a news program has 12 stories, the news program may have 12 portions. If a news program has four segments (e.g., top stories, local news, sports and weather), the news program may have four portions. A portion may also be created by a user. For example, if a user is watching a movie and at some point pauses the movie, a portion may be the part of the movie between the start and the time the movie was paused.

In some embodiments, the media guidance application may determine that an object in the media asset is of interest to the user. For example, the media guidance application may be presenting a news program to a user. While presenting the news program, the media guidance application may detect in the news program a scene from a football game. The media guidance application may then determine that the scene from a football game is an object in the news program. The media guidance application may retrieve keywords, phrases, etc. (e.g., from subtitles) associated with the object. The media guidance application may further access a user profile that stores the user's interests. The user profile may also contain keywords that describe the user's interests. The media guidance application may compare the keywords associated with the object to the keywords in the user profile. If a predetermined number of keywords match, the media guidance application has determined that an object in the media asset is of interest to the user.

In order to determine whether or not objects exist in the media asset, the media guidance application may access a database that lists objects that can be found in media assets at certain times during playback, how long objects are presented, etc. For example, the database may contain an entry for a media asset that indicates that a particular object appears at the twenty-three minute mark of the media asset.

In another example, the media guidance application may detect objects in a media asset using object recognition. For example, the media guidance application may incorporate and/or have access to a content recognition module. The content recognition module may use object recognition techniques such as edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique to monitor the appearance (or lack thereof) of one or more objects. For example, the media guidance application may be monitoring the video of the media asset. The video may include a series of frames. For each frame of the video, the media application may use a content recognition module or algorithm to detect the objects in each of the frames or series of frames.

In some embodiments, the content recognition module or algorithm may also include speech recognition techniques, including but not limited to Hidden Markov Models, dynamic time warping, and/or neural networks (as described above) to translate the audio signal of the media asset into text and/or processing audio data. For example, the content recognition module may monitor the audio signal for indications of objects in a media asset. A character in a media asset may be describing a motorcycle that he was just riding. From that description, the media guidance application may detect that a motorcycle is part of a scene currently being presented to the user. Additionally or alternatively, the content recognition module may recognize the sound of a motorcycle being driven in the media asset in order to detect the motorcycle.

As referred to herein, an "object" is any user-identifiable part of a media asset that is distinct from other identifiable parts in the media asset. For example, an object can be any physical object in the media asset, which can include a bottle of soda, a couch, a ball, a house, etc. Also, any person, animal or plant may be an object. A scene may also be an object in a media asset. For example, a scene of a football game can include a stadium, fans, players, referees, etc. Actors and characters in a movie may also be objects. For example, if a certain actor is portraying the current president of the United States, both the actor and the president of the United States may be objects in the media asset.

Once the media guidance application detects an object in the media asset, it may compare the object with the user's interests. The user's interests may be stored in a user profile. If the user is interested in the sport of football, the user profile may store football as a user's interest. Additionally or alternatively, the user's favorite professional football team, favorite college team and favorite players on those teams may be stored. The user profile may be located locally on the user device or remotely to be retrieved by the user device via a network connection.

The media guidance application may allow a user to provide user profile information or may automatically compile user profile information. The media guidance application may, for example, monitor the content the user accesses and/or other interactions the user may have with the guidance application. Additionally or alternatively, the media guidance application may obtain all or part of other user profiles that are related to a particular user (e.g., from other web sites on the Internet the user accesses, such as www.all-rovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

In some embodiments, the media guidance application may determine that a supplemental asset that corresponds to the object is available. For example, the media guidance application may search a database of supplemental assets to compare the object with the supplemental assets in the database. The media guidance application may also search the Internet for available supplemental assets. The media guidance application may use any commercial search engine or any specialized search engine to search the internet. For example, if the user is interested in football and a scene from a football game appears in a movie that the user is watching, the media guidance application may search the database of supplemental assets for football-related objects. One of those objects could be a notification to the user that a college football game is going to be broadcast in the near future. Additionally or alternatively, the object may be an email to the user informing the user that tickets are available for a football game featuring the user's favorite college football team.

In some embodiments, in response to determining that the supplemental asset is available, the media guidance application may increment a counter, where the counter corresponds to a total number of supplemental assets available for the portion of the media asset. A counter may be a software module that keeps track of a number of supplemental assets available to the user. The software module may store multiple counters. For example, if the media guidance application determined that a supplemental asset is available for "football", the media guidance application may increment a counter for the current portion of the media asset. If the counter previously stood at "four" (corresponding to four previously appearing objects that had supplemental assets available), the media guidance application may increment the counter to read "five" (corresponding to the addition of the supplemental asset for "football"). When the media guidance application detects, that a new portion of the media asset has begun, the counter is reset to zero. Additionally or alternatively, the media guidance application may store a second counter corresponding to a number of supplemental assets available for the whole media asset. This counter is not reset in response to a beginning of a new portion of the media asset. Both of these counters may be incremented by one or may be incremented by another number. For example, if two supplemental assets are available for one object of interest to the user, the media guidance application may make two supplemental assets available to the user and may increment the counter by two.

In some embodiments, the media guidance application may then determine that the portion of the media asset is no longer being presented. In some embodiments, the media guidance application may determine that the portion of the media asset is no longer being presented based on a trigger. As referred to herein, "a trigger" may be anything that causes the media guidance application to determine that a portion of the media asset has ended. For example, the media guidance application may detect a trigger in the media asset that indicates that a scene has ended or a commercial break has begun. The media guidance application may also detect a trigger in the media asset that indicates that movie credits are being currently presented. Additionally or alternatively, the trigger may be the act, by the user, of pausing the media asset.

A trigger may be based on any information. For example, a trigger may be metadata or a black screen that is presented before any commercial break. Additionally or alternatively, the trigger may be a software module that retrieves, from a database, all times in a media asset where a known portion of the media asset ends. A trigger may also be a software module that detects that a user paused or otherwise stopped the presentation of the media asset. A trigger may also be part of the object recognition system described above. The object recognition system may detect an end of a portion of a media asset based on a shape in the media asset or a particular scene in the media asset.

In some embodiments, in response to determining that the portion of the media asset is no longer being presented, the media guidance application may indicate, to the user, the total number of supplemental assets available for the portion of the media asset. For example, the media guidance application may display a number (e.g., "23") corresponding to the twenty-three supplemental assets that are available to the user. The number may be selectable by the user in order to bring up further details of the supplemental assets available. These details may include any of a short description of the supplemental asset, a short summary of the supplemental asset and a description of the related object in the media asset. The indicator may also represent the rank of the media asset compared with other media assets that the user consumed during a particular amount of time (e.g., a day, a week, a month, etc.). The indicator may also represent a rating of the media asset based on ratings from other users. The rating may be based on a scale (e.g., five stars to one star). Additionally or alternatively, the user selecting the indicator may enable the user to recommend the media asset to other users.

In some embodiments in response to determining that the portion of the media asset is no longer being presented, the media guidance application generates for display a user-selectable indication of the supplemental asset, wherein the user-selectable indication comprises information about the supplemental asset. For example, the user may select the number of supplemental assets available that is displayed. In response to the user selecting the number, the media guidance application may further present multiple selectable indications that correspond to supplemental assets available. These indications may include any of a short description of the supplemental asset, a short summary of the supplemental asset or a description of the corresponding object in the media asset. Alternatively, the indication can be a title of the supplemental asset, or any other information about the supplemental asset that may be useful to the user.

A user-selectable indication may be a link to the supplemental asset. For example, if a supplemental asset is an email and the user selects the supplemental asset, the media guidance application may execute the user's email program in order to retrieve the email. For example, if the supplemental asset is a link to a website, the media guidance application may open an Internet browser and navigate to the website address corresponding to the indication. Additionally or alternatively, the user-selectable indication may include an icon representing the type of supplemental asset (e.g., email or website) and a short summary of the supplemental asset. The indication may also include a sound associated with a number of media assets available to the user. For example, a different sound may be played based on a number of supplemental assets available. Also, a different sound volume may be selected based on the number of supplemental assets available.

In some embodiments, the media guidance application may also determine whether the user selected the user-selectable indication and determine, based on whether the user selected the user-selectable indication, whether or not to present to the user, at a future time, a second supplemental asset related to the supplemental asset. For example, if the user selected a supplemental asset containing an offer for tickets to the user's favorite college football team's game, the media guidance application may present to the user offers to buy tickets to other games involving his favorite college football team. Additionally or alternatively, the media guidance application may present to the user offers to buy tickets to other football games and sporting events involving other sports and sports teams. Conversely, if the user did not select the offer to buy tickets, the media guidance application may not present to the user offers to buy tickets to future football games.

In some embodiments, the user-selectable indication may include an indication of user's level of interest in the supplemental asset. The media guidance application may then store the user's level of interest in the supplemental asset and determine, based on the stored level of interest, whether to present a second supplemental asset, related to the supplemental asset, at a future time. For example, the media guidance application may generate for display an icon containing three colors (e.g., green, yellow and red) selectable by the user that indicate the user's level of interest in watching an upcoming interview with his favorite actor. If a user selects the green part of the icon, the media guidance application may present to the user future interviews with the user's favorite actor or other actors. If the user selects the yellow part of the icon, the media guidance application may present to the user future interviews with his favorite actor only and not other actors. If the user selects the red part of the icon, the media guidance application may not present any future interviews to the user.

In some embodiments, in response to determining that the supplemental asset that corresponds to the object is available, the media guidance application may notify the user during the presentation of the portion of the media asset that the supplemental asset is available. For example, if a media guidance application determines that tickets are available for a football game involving the user's favorite team, the media guidance application may notify the user of the availability of the offer by having the device on which the media asset is being presented alert the user (e.g., through a vibration, an audio tone, a visual cue, etc.) before the end of the current portion of the media asset. The media guidance application may alert the user of the supplemental asset in different ways, depending on the type of the supplemental asset. For example, if the supplemental asset is an email, the media guidance application may notify the user of the availability of the email through a vibration. If the supplemental asset is a link to an Internet web page, the media guidance application may generate an audio tone, and if the supplemental asset is an offer to present another media asset, the notification may be a visual cue.

In some embodiments, the media guidance application may increment the counter in response to determining that an additional supplemental asset is available for the object in the portion of the media asset. For example, if a media guidance application determines that a baseball game is available for viewing based on the user being interested in baseball and characters playing baseball in the movie being watched by the user, the media guidance application may increment the counter of events of interest to the user. If the media guidance application determines that an offer to buy baseball tickets is an additional available supplemental asset, the media guidance application may increment the counter again. The media guidance application may also only increment the counter by one if one supplemental asset is available for multiple objects in the media asset. For example, if a user is interested in shopping and cooking and an object being presented in the media asset is a cookbook, the media guidance application may only increment the counter by one for a supplemental asset that represents an offer to buy the cookbook despite the supplemental asset matching both user interests.

In some embodiments, the media guidance application may indicate the number of supplemental assets available to the user on one of a different device and a different screen. For example, the media guidance application may be presenting the media asset to the user via a smart TV or a set-top box. The media guidance application may also detect that a user owns an electronic tablet or a smart phone. The media guidance application may then generate for display the counter of available supplemental assets on the electronic tablet and/or the smart phone. Additionally or alternatively, if a device on which the media guidance application is presenting the media asset has more then one display, the counter may be presented on a different display then the display where the media asset is being presented.

In some embodiments, the media guidance application may aggregate the displayed counters as the media asset progresses. For example, a media asset may be presented to the user (e.g., a movie). The media guidance application may determine that three supplemental assets are available to the user prior to the first commercial break. During the first commercial break, the media guidance application may present to the user a counter that indicates the number three, "3," corresponding to three available supplemental assets. If the user does not select the counter, the media guidance application may store the value of the counter and the corresponding supplemental assets for a later presentation to the user. As the media asset progresses, the media guidance application may determine, prior to the second commercial break, that another two supplemental assets are available to the user. Because the user did not select the counter at the first commercial break, the media guidance application may aggregate the counter and the corresponding supplemental assets and present to the user the number five "5," corresponding to the total number of supplemental assets available to the user prior to the first commercial break and the second commercial break. Alternatively, if the user selected the counter after the first commercial break, the counter would not be aggregated and would be reset to zero.

In some embodiments, the media guidance application may aggregate all supplemental assets available for the entire media asset. For example, the media guidance application may search for supplemental assets based on the objects in the media asset and the user's interest and present those to the user during a break in the presentation of the media asset. The media guidance application may store a second counter representing the number of supplemental assets available for the entire media asset. That counter may be presented during end credits regardless as to whether the user selected any counter during any other break in presentation of the media asset. The second counter may be stored and incremented in parallel with the first counter as described above.

Figure 2:
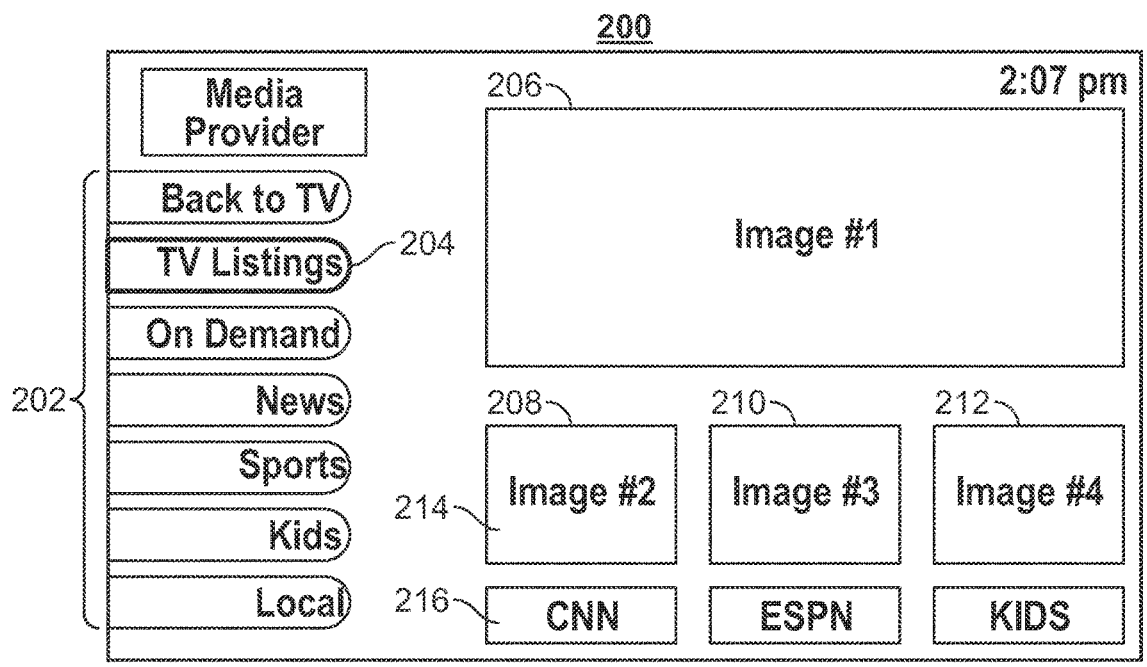
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No.

7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
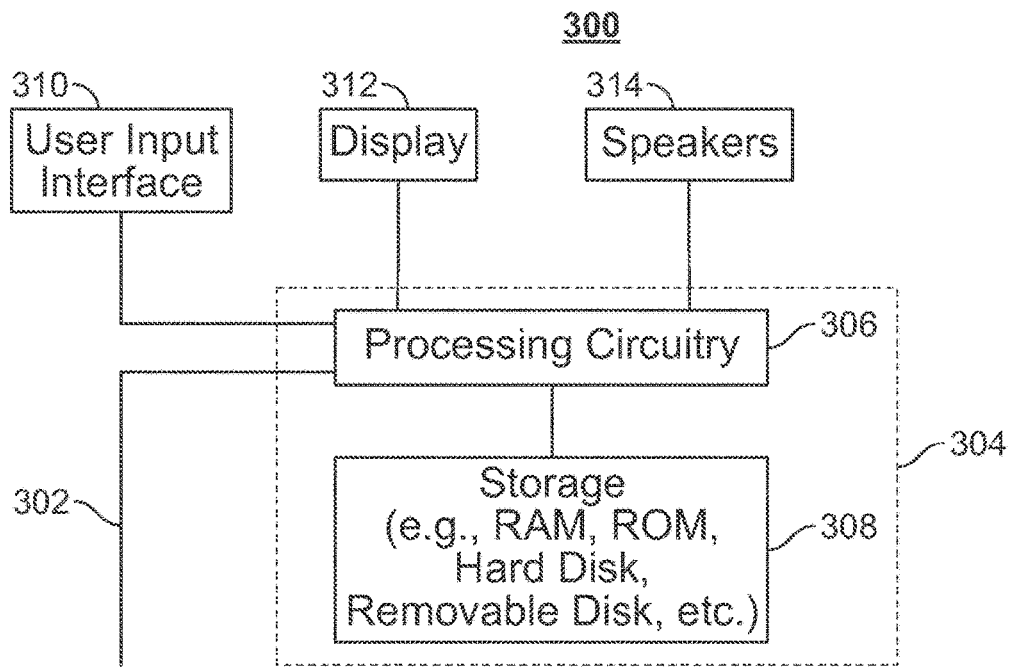
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
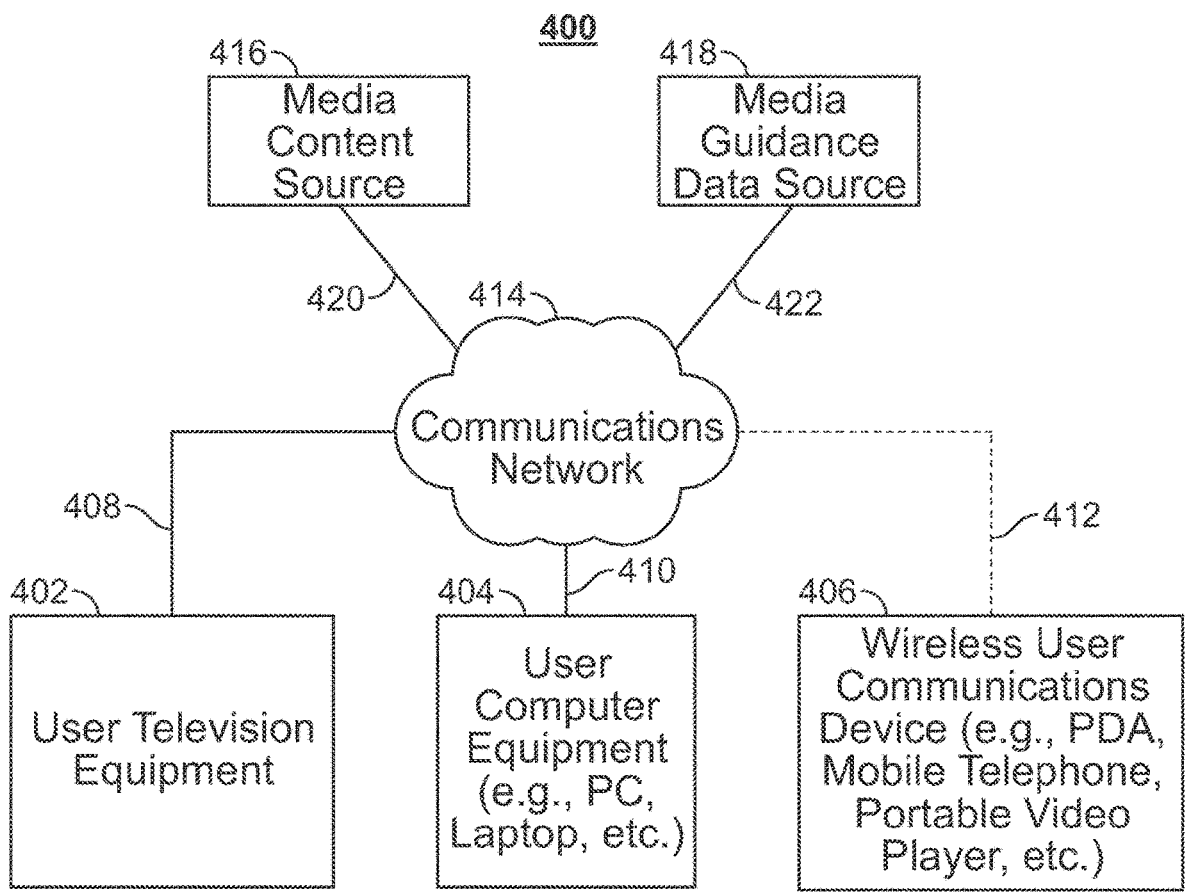
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first user device. In some embodiments, the second screen device provides an interface for adjusting settings and display preferences of the first user device. In some embodiments, the second screen device is configured for interacting with other second screen devices or for interacting with a social network. The second screen device can be located in the same room as the first user device, a different room from the first user device but in the same house or building, or in a different building from the first user device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
FIG. 5 shows an illustrative embodiment of a display screen that may be used to provide an indication of a total number of supplemental assets available for the portion of the media asset to the user, in accordance with some embodiments of the disclosure.

FIG. 5 shows an illustrative example of a screen that would present an indicator to the user of the number of supplemental assets available. Display screen 500 presents a display 520 of movie credits, and a number of supplemental assets available to the user via indicator 504.

In FIG. 5, the media guidance application has determined that twenty-three media assets are available to the user by displaying indicator 504. The user may select via input interface 310 (FIG. 3) indicator 504 in order to get more information on the available supplemental assets. Once the user selects indicator 504, the media guidance application may generate for display an indicator of each available supplemental asset. The indicator may include a short description of the asset as well as other information about the asset. Indicator 504 may be based on a household profile where the media guidance application may store interests for every user in a household in the same profile and treat all the member of the household as one user. Members of a household may be family members living in the same house or apartment. Alternatively, members of a household may be any number of people who share at least one user equipment device on which the media guidance application resides. Indicator 504 may also be based on an individual user. For example, when the media guidance application starts a presentation of a media asset, the media guidance application may present to the user an option to login in order to establish user's identity. Additionally or alternatively, the media guidance application may use a face recognition module in conjunction with a camera on a user equipment device in order to determine the user's identity. If the media guidance application detects more then one user, it may present supplemental assets that correspond to user interests of each user. Additionally or alternatively, the media guidance application may only present those supplemental assets that are of interest to all the users detected.

If multiple users are consuming the media asset, the media guidance application may display multiple indicators 504. Each indicator may correspond to each user detected. For example, if three users are consuming a media asset, the media guidance application may detect that all three users have separate profiles and different interests. The media guidance application may then assign a color to each counter to represent a particular user. Alternatively, the media guidance application my present an indication (e.g. photo, icon, name, etc.) corresponding to each user together with the counter corresponding to each user.

Indicator 504 may be visible and available for user selection while the credits are scrolling. The indicator may disappear once the presentation of the media asset has ended. If indicator 504 is presented to the user during a commercial break, indicator 504 may appear on the screen until the commercial break is over and the media asset presentation is resumed. If a user selects indicator 504, the media guidance application may present to the user a selectable list of available supplemental assets. The media guidance application may also pause the media asset and remove it from the display. Alternatively, the media guidance application may present the list of supplemental assets on the same screen as the media asset by decreasing the area of the screen on which the media asset is being presented and presenting the list of supplemental assets next to the media asset.

The media guidance application may present other options to the user once the user selects indicator 504. For example, the media guidance application may present an option for the user to share the user's opinions about the media asset on a social networking site. The media guidance application may also present an option to the user to share the user's opinion of each supplemental asset on a social networking site.

Indicator 504 may be of any size. For example, indicator 504 may change depending on the size of the display that the media asset is being presented on. The media guidance application may also change the size of the indicator depending on the resolution of the display or on whether the media asset is presented in standard definition or high definition. Indicator 504 may be presented in different colors. For example, indicator 504 may be presented in red if the supplemental assets corresponding to the indicator have been popular with other users. Alternatively, the indicator may be blue if the supplemental assets corresponding to the indicator have not been popular with other users. The media guidance application may access a database that stores the supplemental assets in order to retrieve popularity information of each supplemental asset. Indicator 504 may also be enclosed in a circle or any other shape, or it may not be enclosed and be presented on its own.

Indicator 504 may represent supplemental assets for only the portion of the media asset preceding the end credits, however it may also represent supplemental assets corresponding to the entire media asset. If indicator 504 is presented during a commercial break, it may represent supplemental assets for the portion of the media asset just prior to the commercial break or it may represent supplemental assets for all the portions of the media asset prior to the commercial break.

The media guidance application may also present indicator 504 on a second display, if the user device includes a second display. In response to a user selection of indicator 504 on the second display, the media guidance application may present the list of supplemental assets on the second display. While indicator 504 is presented and also while the list of supplemental assets is presented, the media guidance application may pause the presentation of the media asset. Alternatively, the media guidance application may present a prompt to the user asking the user to either pause the media asset or let the media asset continue being presented. If the user instructs the media guidance application to continue presenting the media asset, the media guidance application may store another counter to represent new supplemental assets that may be available to the user for the next portion of the media asset.

The media guidance application may also present indicator 504 on a different user equipment device. For example, if the media guidance application is presenting a media asset via a set-top box or smart TV, the media guidance application may present indicator 504 on a smart phone or an electronic tablet associated with the user. If the media guidance application presents indicator 504 on another device, all other operations (e.g. selecting the indicator, presenting the supplemental asset, selecting a supplemental asset, etc.) may be performed on the other device.

Figure 6:
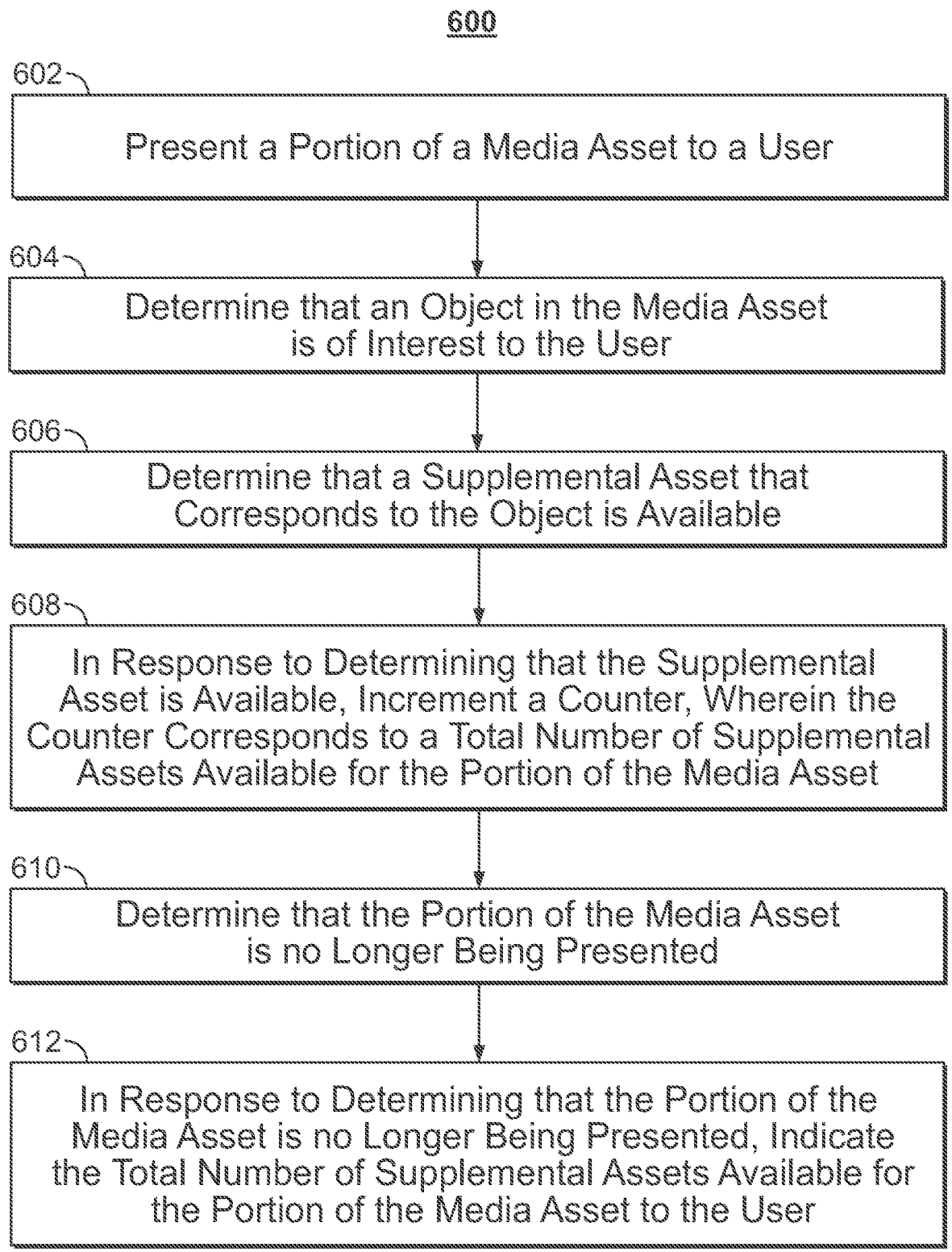
FIG. 6 is a flowchart of illustrative steps involved in indicating the total number of supplemental assets available for the portion of the media asset to the user, in accordance with some embodiments of the disclosure.

FIG. 6 is a flowchart of illustrative steps for indicating an amount of content of interest to users. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 600 may be incorporated into or combined with one or more steps of any other process or embodiment (e.g., process 700 (FIG. 7)).

At step 602, a media guidance application presents (e.g., via control circuitry 304 (FIG. 3)) a portion of a media asset to a user. For example, the media guidance application may display the video of the media asset on display 312 (FIG. 3) and play the audio of the media asset on speakers 314 (FIG. 3). In some embodiments, the media guidance application may retrieve the media asset from one or more sources (e.g., storage 308 (FIG. 3), media content source 416 (FIG. 4), etc.), and guidance data associated with the media asset may be retrieved from a source of media guidance data (e.g., media guidance data source 418 (FIG. 4)).

At step 604, the media guidance application determines (e.g., via control circuitry 304 (FIG. 3)) that an object in the media asset is of interest to the user. For example, the media guidance application may determine (e.g., via control circuitry 304 (FIG. 3)) that a user has an existing user profile. The user profile may be stored locally in storage 308 (FIG.

3) or it can be stored at the media guidance data source 418 (FIG. 4). The user profile may contain data indicating a user's interests. The media guidance application may detect (e.g., via control circuitry 304 (FIG. 3)) an object in the media asset (e.g., via object recognition, cross-referencing a database, etc.). The media guidance application may compare (e.g., via control circuitry 304 (FIG. 3)) a user's interests in the user profile to the detected object in order to determine a match between the user's interests and the object.

At step 606, the media guidance application determines that a supplemental asset that corresponds to the object is available. For example, the media guidance application may access (e.g., via control circuitry 304 (FIG. 3)) a database that lists available supplemental assets. The media guidance application may then cross-reference the object with the database to determine if a match between at least one supplemental asset and the object exists. The database may be stored locally in storage 308 (FIG. 3) or may be stored at the media guidance data source 418 (FIG. 4). If the database is stored at media guidance data source 418 (FIG. 4), the media guidance application may access the database via communications network 414 (FIG. 4) If a match exists, the media guidance application may move to step 608.

At step 608, in response to determining that the supplemental asset is available (e.g., via control circuitry 304 (FIG. 3)), the media guidance application increments a counter, where the counter corresponds to a total number of supplemental assets available for the portion of the media asset. For example, the media guidance application may increment the counter by one if one match is found between the object and a supplemental asset in the database. Alternatively, the media guidance application may increment the counter by a number of supplemental assets available that match the object. For example, if the user is interested in sports and the supplemental asset database includes an offer to buy tickets for an upcoming baseball game and an upcoming football game, the media guidance application may increment the counter by two. The counter may be stored locally in storage 308 (FIG. 3). Additionally or alternatively, the counter may be stored at the media guidance data source 418 (FIG. 4). The counter may be incremented at the media guidance data source 418 (FIG. 4) via a communications network 414 (FIG. 4).

At step 610, the media guidance application determines that the portion of the media asset is no longer being presented. For example, the media guidance application may detect via control circuitry 304 (FIG. 3) that a media asset is either at a commercial break, at an end of a scene or at the credits (illustrated in FIG. 5). As described in an earlier part of this application, the media guidance application may detect via control circuitry 304 (FIG. 3) that the media asset is no longer being presented by accessing metadata of the media asset that can store information on when in the media asset commercial breaks start and end and when the credits are presented. This metadata may be stored locally in storage 308 (FIG. 3) or it may be stored at the media guidance data source 418 (FIG. 4) and may be accessible through a communications network 414 (FIG. 4).

At step 612, in response to determining that the portion of the media asset is no longer being presented, the media guidance application indicates to the user the total number of supplemental assets available for the portion of the media asset. For example, the media guidance application may present to the user, during the credits the number twenty three "23," corresponding to twenty three available supplemental assets. This is illustrated in FIG. 5.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
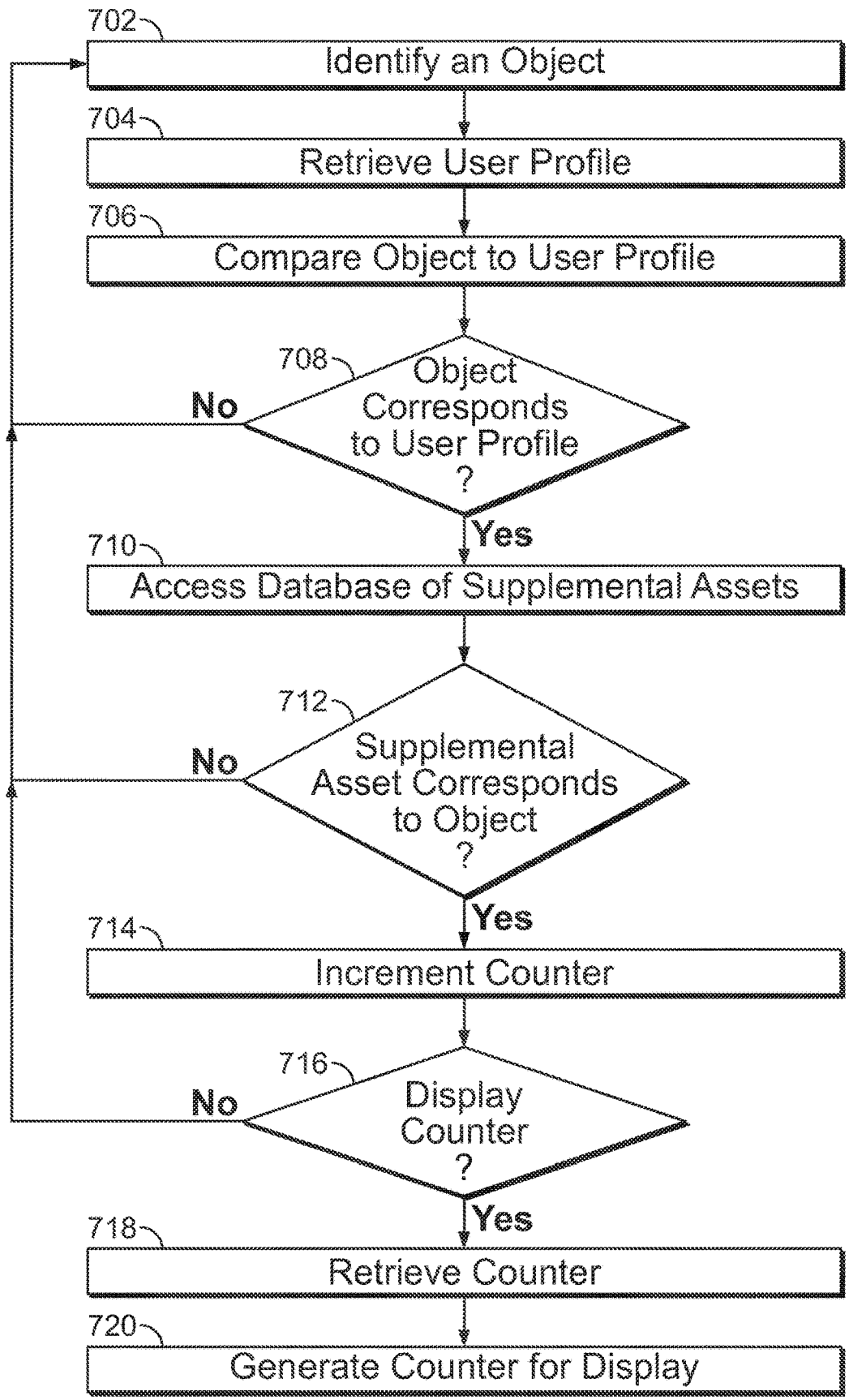
FIG. 7 is a flowchart of illustrative steps involved in determining whether a supplemental asset that is of interest to the user is available and whether the media guidance application may increment and display a counter based on the availability of the supplemental asset, in accordance with some embodiments of the disclosure.

FIG. 7 is a flowchart of illustrative steps for indicating an amount of content of interest to users. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to indicate an amount of content of interest to a user. In addition, one or more steps of process 700 may be incorporated into or combined with one or more steps of any other process or embodiment (e.g., process 600 (FIG. 6)).

At step 702, the media guidance application identifies (e.g., via control circuitry 304 (FIG. 3)) an object. The media guidance application may identify the object based on information from a database or based on object recognition methods discussed earlier in this application. For example, the media guidance application may include a content recognition module stored on storage 308 (FIG. 3). The content recognition module may be utilized by the media guidance application (e.g., via control circuitry 304 (FIG. 3)) to identify objects in a media asset. Alternatively, the content recognition module may be included in the media guidance data source 418 (FIG. 4). Objects in media assets may be identified before the media asset is presented to the user and the media guidance application may send object identification requests to the media guidance data source 418 (FIG. 4) via a communications network 414 (FIG. 4).

At step 704, the media guidance application retrieves one or more user profiles. The media guidance application may determine (e.g., via control circuitry 304 (FIG. 3)) that a user may have an associated user profile. Alternatively, the media guidance application may determine that only a household profile (discussed earlier) exists and retrieve that profile. Also, the media guidance application may determine the identity of a user based on a user login provided prior to or during the presentation of the media asset. In yet another alternative the media guidance application may detect through a use of a camera that one or more users are consuming the media asset. The media guidance application may use face recognition algorithms to detect all users present and retrieve their user profiles if those user profiles exist. The media guidance application may use any combination of these methods to identify users. The user profile may be stored locally on the user's device in storage 308 (FIG. 3) or at the media guidance data source 418 (FIG. 4) and may be accessed by the media guidance application via communications network 414 (FIG. 4). Once the media guidance application accesses the user profile it may retrieve portions of the user profile that include the user's interests. Alternatively, the media guidance application may retrieve the full user profile.

At step 706, the media guidance application compares (e.g., via control circuitry 304 (FIG. 3)) the object to the user profile. For example, the object in the media asset may have data associated with the object. The associated data may be stored locally in storage 308 (FIG. 3) or at media guidance data source 418 (FIG. 4) and may include keywords associated with the object. The user profile may include keywords associated with the user's interests. The media guidance application may compare the keywords associated with the object to the keywords associated with the user's interests and determine via control circuitry 304 whether any keywords associated with the object match any of the keywords associated with the user's interests.

At step 708, the media guidance application determines (e.g., via control circuitry 304 (FIG. 3)) whether the object corresponds to the user profile. For example, if a number of matched keywords reaches a predetermined threshold, the media guidance application may proceed to step 710.

At step 710, the media guidance application accesses (e.g., via control circuitry 304 (FIG. 3)) a database of supplemental assets. For example, the database of supplemental assets may be stored locally in storage 308 (FIG. 3) or it may be stored at media guidance data source 418 (FIG. 4). If the database of supplemental assets is stored at the media guidance data source, the media guidance application may access this database over the communications network 414 (FIG. 4).

At step 712, the media guidance application determines (e.g., via control circuitry 304 (FIG. 3)) whether a supplemental asset in the database of supplemental assets corresponds to the object from the media asset. For example, as discussed above, the object from the media asset and the supplemental asset from the database of supplemental assets may have associated keywords. The media guidance application may compare (e.g., via control circuitry 304 (FIG. 3)) the keywords to determine if any matches exist between the objects. Alternatively, if the database of supplemental assets is stored at media guidance data source 418 (FIG. 4), the media guidance application may transmit via communications network 414 (FIG. 4) keywords associated with the object to media guidance data source 418 (FIG. 4). The media guidance data source may include processing circuitry to perform the comparison in order to find matches between the keywords. If a number of matches does not reach a predetermined threshold, the media guidance application may proceed to step 702 to identify other objects. If the predetermined threshold is reached, the media guidance application may receive, via communications network 414 (FIG. 4), from media guidance data source 418 (FIG. 4), supplemental assets or alternatively supplemental asset identifiers to present to the user. Supplemental asset identifier may be data associated with the supplemental asset and may also include a code (e.g. a set of letters, a set of numbers or a combination of letters and numbers) to identify a particular supplemental asset in the database of supplemental assets. For example, a supplemental asset identifier may include a short description of the supplemental asset, a title of the supplemental asset and an alphanumeric string to identify the supplemental asset in the database of supplemental assets. Supplemental asset identifiers may be used in order to limit amount of data transfer over the network. The media guidance application may retrieve the full supplemental asset only when the user selects it.

At step 714, the media guidance application increments a counter (e.g., via control circuitry 304 (FIG. 3)). For example, the counter may represent the number of supplemental assets available to the user for a current portion and/or one or more other portions of a media asset. The counter may be stored locally in storage 308 (FIG. 3) or it may be stored at media guidance data source 418 (FIG. 4). If the counter is stored at media guidance data source 418 (FIG. 4), the media guidance application may access the counter via communications network 414 (FIG. 4) in order to increment the counter.

At step 716, the media guidance application determines (e.g., via control circuitry 304 (FIG. 3)) whether to display the counter. As discussed earlier in this application the counter may be displayed when a portion of the media asset is not being displayed (e.g., during a commercial, while the credits are being displayed, etc.). If the media guidance application determines (e.g., via control circuitry 304 (FIG. 3)) that a portion of a media asset is still being presented, the counter may not be displayed and the media guidance application may revert to step 702. If the media guidance application determines (e.g., via control circuitry 304 (FIG. 3)) that a counter needs to be displayed, it may proceed to step 718.

At step 718, the media guidance application retrieves the counter. As discussed earlier in this application, the counter may be stored locally in storage 308 (FIG. 3) or at media guidance data source 418 (FIG. 4). If the counter is stored locally in storage 308 (FIG. 3), the counter may be retrieved using processing circuitry 306 (FIG. 3). Alternatively, if the counter is stored at media guidance data source 418 (FIG. 4), the media guidance application may retrieve the counter via communications network 414 (FIG. 4).

At step 720, the media guidance application generates a counter for display. For example, the media guidance application may use processing circuitry 306 (FIG. 3) to generate the counter for display on display 312 (FIG. 3). Alternatively, if the user device has multiple displays 312 (FIG. 3), the processing circuitry may generate the counter on the appropriate display. For example, if a movie is playing on the first display 312 (FIG. 3) and a second display 312 (FIG. 3) is either idle or does not have content associated with it, the media guidance application may present the counter on that screen. The user may have several devices associated with him (e.g., smart TV, set-top box, electronic table, smart phone, etc.). If the media guidance application is presenting a media asset on a smart TV or a set-top box, the media guidance application may generate for display the counter on an electronic tablet or a smart phone that is associated with the user.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of indicating an amount of content of interest, the method comprising:
   determining a visual object in a video presented in a user interface;
   determining a match between a supplemental asset, distinct from the video, and the visual object in the video;
   in response to the determining the match between the supplemental asset and the visual object in the video, incrementing a counter, wherein the counter is indicative of a total number of distinct supplemental assets matched with visual objects in the video;
   determining that the video is no longer being presented within the user interface; and
   in response to the determining that the video is no longer being presented:
      generating for display, as part of the user interface, a value of the counter; and
      in response to a user interface interaction with the counter:
         generating for display identifiers for the distinct supplemental assets matched with visual objects in the video; and
         resetting the counter.

2. The method of claim 1, wherein the match is a first match and the supplemental asset is a first supplemental asset, further comprising, in response to determining a second match between a second supplemental asset and the visual object, incrementing the counter.

3. The method of claim 1, wherein the match is a first match and the visual object is a first visual object, further comprising, in response to determining a second match between the supplemental asset and the second visual object, incrementing the counter.

4. The method of claim 1, wherein the match is a first match, the visual object is a first visual object, and the supplemental asset is a first supplemental asset, further comprising, in response to determining a second match between a second supplemental asset and a second visual object, incrementing the counter.

5. The method of claim 1, wherein determining that the video is no longer being presented comprises determining that a commercial break is being generated for display in place of the video.

6. The method of claim 1, wherein determining that the video is no longer being presented comprises determining that closing credits are being generated for display in place of the video.

7. The method of claim 1, wherein the generating for display the value of the counter comprises automatically generating for display, the value of the counter without receiving a user request to display the value.

8. The method of claim 1, further comprising, in response to the determining that the video is no longer being presented, generating for display a user-selectable indication of the supplemental asset, wherein the user-selectable indication comprises information about the supplemental asset.

9. A system for indicating an amount of content of interest, the system comprising:
   control circuitry configured to:
      determine a visual object in a video presented in a user interface;
      determine a match between a supplemental asset, distinct from the video, and the visual object in the video;
      in response to the determining the match between the supplemental asset and the visual object in the video, increment a counter, wherein the counter is indicative of a total number of distinct supplemental assets matched with visual objects in the video; and
      determine that the video is no longer being presented within the user interface; and
   output circuitry configured to, in response to the control circuitry determining that the video is no longer being presented:
      generate for display, as part of the user interface, a value of the counter; and
      in response to a user interface interaction with the counter:
         generate for display identifiers for the distinct supplemental assets matched with visual objects in the video; and
         reset the counter.

10. The system of claim 9, wherein the match is a first match and the supplemental asset is a first supplemental asset, wherein the control circuitry is further configured to, in response to determining a second match between a second supplemental asset and the visual object, increment the counter.

11. The system of claim 9, wherein the match is a first match and the visual object is a first visual object, wherein the control circuitry is further configured to, in response to determining a second match between the supplemental asset and the second visual object, increment the counter.

12. The system of claim 9, wherein the match is a first match, the visual object is a first visual object, and the supplemental asset is a first supplemental asset, wherein the control circuitry is further configured to, in response to determining a second match between a second supplemental asset and a second visual object, increment the counter.

13. The system of claim 9, wherein the control circuitry is configured to determine that the video is no longer being presented by determining that a commercial break is being generated for display in place of the video.

14. The system of claim 9, wherein the control circuitry is configured to determine that the video is no longer being presented by determining that closing credits are being generated for display in place of the video.

15. The system of claim 9, wherein the output circuitry is configured to generate for display the value of the counter by automatically generating for display, the value of the counter without receiving a user request to display the value.

16. The system of claim 9, wherein the output circuitry is further configured to, in response to the control circuitry determining that the video is no longer being presented, generate for display a user-selectable indication of the supplemental asset, wherein the user-selectable indication comprises information about the supplemental asset.

* * * * *